United States Patent

Hackett et al.

[11] 4,328,078
[45] May 4, 1982

[54] METHOD OF PRODUCING CARBON-13 BY MULTIPHOTON DECOMPOSITION OF $C_3F_6$

[76] Inventors: Peter A. Hackett, 2111 Montreal Rd; Wing S. Nip, 341 MacLaren; Clive Willis, 151 Kamloops, all of Ottawa, Ontario, Canada

[21] Appl. No.: 132,656

[22] Filed: Mar. 21, 1980

[51] Int. Cl.$^3$ ............................................. B01D 59/00
[52] U.S. Cl. ........................ 204/158 R; 204/DIG. 11
[58] Field of Search ........................ 423/2; 204/157.1; 204/158

[56] References Cited

U.S. PATENT DOCUMENTS 4,120,767  10/1978  Bitterson et al. ............... 204/158 R

OTHER PUBLICATIONS

Woodin et al., "Multiphoton Dissociation of Molecules . . .", Chem. Abstracts, vol. 91, (1979) #184871t.
Avatkov et al., "Multiphoton Adsorption and Dissociation . . .", Sov. J. Quantum Electron., 9(2) Feb. 1979, pp. 232-235.

Primary Examiner—Deborah L. Kyle
Attorney, Agent, or Firm—James R. Hughes

[57] ABSTRACT

A method of producing carbon—13 by multiphoton decomposition of $C_3F_6$, said material containing carbon—12 and carbon—13 isotopic species, comprising irradiating gaseous $C_3F_6$ in a reaction chamber at a pressure below 10 Torr with a laser beam at a frequency in the range of 950 to 1020 wavenumbers and providing a minimum fluence of 1 joules per sq. cm. and passing the material through a physical separation stage to obtain a $^{13}C_2F_4$ product.

2 Claims, 4 Drawing Figures

METHOD OF PRODUCING CARBON-13 BY MULTIPHOTON DECOMPOSITION OF $C_3F_6$

This invention relates to a method for isotopic enrichment by laser radiation and more particularly to a method of producing carbon-13 by multiphoton decomposition of $C_3F_6$ (perfluoropropene).

The use of carbon-13 as an industrial compound is not widespread at the present time but is expected to increase. Extensive application of carbon-13 to medical screening programs is anticipated. The present method of production is by low temperature distillation of carbon monoxide and this process is expensive, provides small throughput, needs large inventory of starting materials, and must be symbiotic with a liquid air plant.

A method of isotopic separation by photopredissociation is described in U.S. Pat. No. 3,983,020 issued Sept. 28, 1976 to C. B. Moore and E. S. Young.

A photochemical method for carbon isotopic enrichment is disclosed in U.S. Pat. No. 4,120,767 issued Oct. 8, 1978 to S. N. Bittenson and P. Houston. This patent describes a process using, as a starting material a gaseous mixture of at least two isotopic $CF_3I$ species and irradiating this mixture in a reaction zone with laser radiation at a pressure below about 10 Torr to cause relative enrichment of one of the species. The enriched residual substrate is $^{13}CF_3I$. This process is effective but yields are low and therefore production costs are high.

In co-pending application No. 25,886 filed Apr. 2, 1979 in the name of Peter A. Hackett, Clive Willis and Michael Gauthier, a method of producing of carbon-13 by multiphoton dissociation of $CF_3Br$ or $CF_3Cl$ is disclosed. In co-pending application No. 32,024 filed Apr. 20, 1979 in the name of Peter A. Hackett, Clive Willis, and Michael Gauthier, a method of producing carbon-13 by multiphoton dissociation of $CF_3COCF_3$ is described.

In drawings which illustrate an embodiment of the invention,

Figure 1:
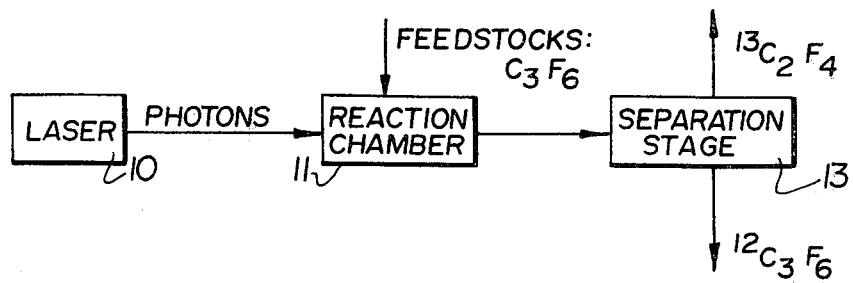
FIG. 1 is a flow diagram of the process.

Referring to FIG. 1, a beam of photons from a laser 10 (preferably a $CO_2$ laser) is directed into a reaction chamber 11 containing gaseous $C_3F_6$. This material occurs as a mixture of two isotopic species e.g. $CF_2{}^{13}CFCF_3$ and $CF_2{}^{12}CFCF_3$. The frequency λ of the laser light is chosen to optimize the excitation of one of the specified species relative to the other species. The reactions that take place are as follows:

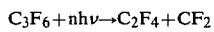

The enriched product that is obtained is $^{13}C_2F_4$. It has been found that this method of enrichment of carbon-13 in the products of multiphoton dissociation of $C_3F_6$ compounds results in high yields and reduced costs of carbon-13 production.

After irradiation the gas mixture is passed to separation stage 13 e.g. a still, for physical separation of products: $^{13}C_2F_4$ (enriched) and $^{12}C_3F_6$.

The irradiation system used would preferably involve focussed or parallel laser beams providing a minimum fluence of 1 joules per sq. cm. (J cm$^{-2}$). The laser frequency used is in the range 950 wavenumbers (cm$^{-1}$) to about 1020 wavenumbers. The irradiation takes place at a pressure below 10 Torr and at room temperatures i.e. 20° C.

Figure 2:
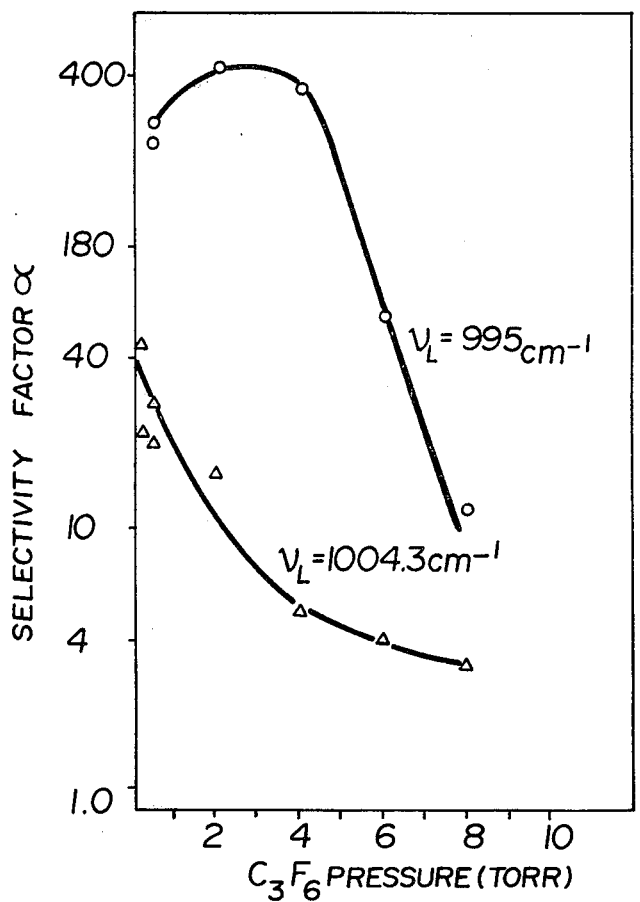
FIG. 2 is a graph showing selectivity factor versus gas pressures.
Figure 3:
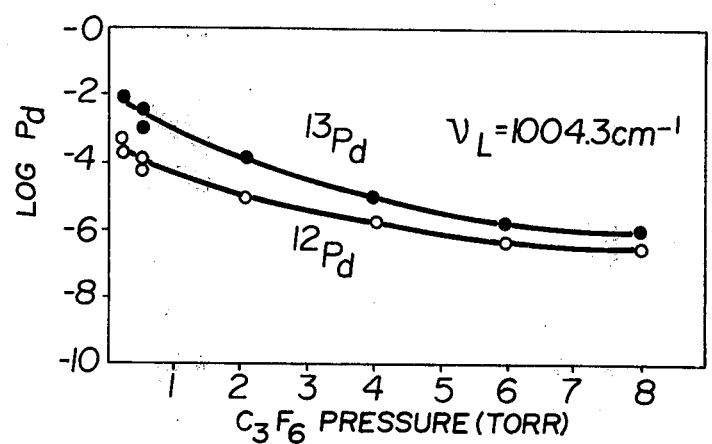
FIGS. 3 and 4 are graphs showing probability of decomposition versus gas pressures.
Figure 4:
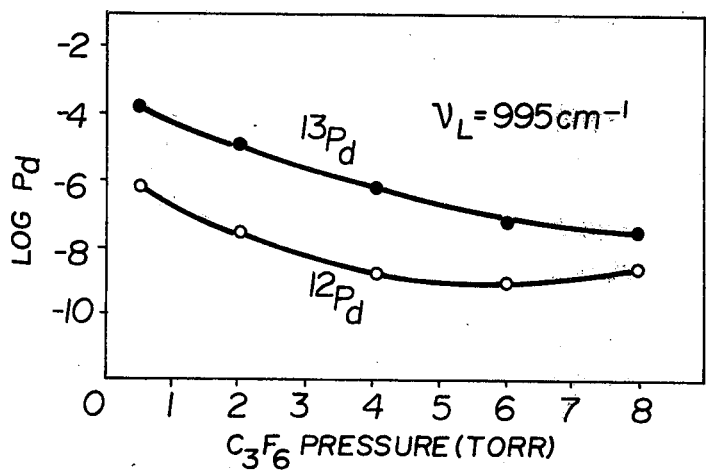

FIG. 2 is a graph giving some experimental results of selectivity factor ($\alpha$) versus gas mixture pressures (Torr) for irradiation frequencies ($\nu_L$) of 995 cm$^{-1}$ and 1004.3 cm$^{-1}$ at an incident fluence of about 2 J cm$^{-2}$. The selectivity factor $\alpha$ = Probability of decomposition of $CF_2{}^{13}CFCF_3$/Probability of decomposition of $CF_2{}^{12}CFCF_3$. FIGS. 3 and 4 are graphs showing experimental results of probability of decomposition ($P_d$) for carbon-12 ($^{12}P_d$) and carbon-13 ($^{13}P_d$) versus initial $C_3F_6$ gas pressure at laser frequencies of $\nu_L = 1004.3$ and $\nu_L = 995$ cm$^{-1}$ and with fluence of about 2 J cm$^{-2}$.

We claim:

1. A method of producing carbon-13 by multiphoton decomposition of $C_3F_6$, said material containing carbon-12 and carbon-13 isotopic species, comprising:
   (a) irradiating gaseous $C_3F_6$ in a reaction chamber at a pressure below 10 Torr with a laser beam at a frequency in the range of 950 to 1020 wavenumbers and providing a minimum fluence of 1 joules per sq. cm. such as to optimize the excitation of one of the specified species relative to the other causing the following reactions to take place:

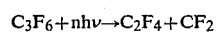

(b) passing the material through a physical separation stage to obtain a $^{13}C_2F_4$ product.

2. A method as in claim 1 wherein the irradiating step is carried out at a temperature near 20° C.

* * * * *